United States Patent [19]
Lin et al.

[11] Patent Number: 4,822,418

[45] Date of Patent: * Apr. 18, 1989

[54] DROP ON DEMAND INK JET INK COMPRISING DUBUTYL SEBECATE

[75] Inventors: An-Chung R. Lin, New Town; Theodore M. Cooke; Alfred R. Merritt, both of Danbury, all of Conn.

[73] Assignee: Dataproducts Corporation, Woodland Hills, Calif.

[ * ] Notice: The portion of the term of this patent subsequent to Jun. 7, 2000 has been disclaimed.

[21] Appl. No.: 149,959

[22] Filed: Jan. 27, 1988

Related U.S. Application Data

[63] Continuation of Ser. No. 801,015, Nov. 22, 1985, abandoned, which is a continuation-in-part of Ser. No. 610,627, May 16, 1984, abandoned, which is a continuation-in-part of Ser. No. 507,918, Jun. 27, 1983, Pat. No. 4,484,948, which is a continuation of Ser. No. 331,604, Dec. 17, 1981, Pat. No. 4,390,369, and a continuation-in-part of Ser. No. 668,095, Nov. 5, 1984, abandoned, and a continuation-in-part of Ser. No. 644,542, Aug. 27, 1984, Pat. No. 4,659,383, which is a continuation of Ser. No. 248,551, Mar. 27, 1981, Pat. No. 4,659,843, and a continuation-in-part of Ser. No. 565,124, Dec. 23, 1983, abandoned, which is a continuation of Ser. No. 394,154, Jul. 1, 1982, abandoned, and a continuation-in-part of Ser. No. 672,587, Nov. 16, 1984, abandoned, and a continuation-in-part of Ser. No. 522,837, Aug. 12, 1983, Pat. No. 4,531,976, which is a continuation of Ser. No. 327,994, Dec. 7, 1981, Pat. No. 4,400,215, and a continuation-in-part of Ser. No. 501,074, Jun. 6, 1983, Pat. No. 4,531,976, which is a continuation of Ser. No. 331,603, Dec. 26, 1981, Pat. No. 4,386,961.

[51] Int. Cl.$^4$ ............................................. C09D 11/00
[52] U.S. Cl. .................................. 106/27; 106/22; 346/1.1
[58] Field of Search ................... 106/22, 27; 346/1.1

[56] References Cited

U.S. PATENT DOCUMENTS

| | | | |
|---|---|---|---|
| 2,426,248 | 8/1947 | Sugarman | 106/23 |
| 3,282,709 | 11/1966 | Ehrhardt et al. | 106/27 |
| 3,282,853 | 11/1966 | Bennett | 252/172 |
| 3,330,673 | 7/1967 | Voet et al. | 106/32 |
| 3,353,974 | 11/1967 | Trimble et al. | 106/31 |
| 3,382,088 | 5/1968 | Noda | 106/27 |
| 3,421,910 | 1/1969 | Gilson et al. | 106/14.5 |
| 3,653,932 | 4/1972 | Berry et al. | 106/22 |
| 3,715,219 | 2/1973 | Kurz et al. | 106/22 |
| 3,846,141 | 11/1974 | Ostergren et al. | 106/22 |
| 3,994,736 | 11/1976 | Hertz et al. | 106/22 |
| 4,005,237 | 1/1977 | Panken | 428/195 |
| 4,038,297 | 7/1977 | Rodenberg et al. | 106/27 |
| 4,069,179 | 1/1978 | Jones | 106/27 |
| 4,108,671 | 8/1978 | Richlin | 106/22 |
| 4,136,076 | 1/1979 | Daniels | 260/29 |
| 4,150,997 | 4/1979 | Hayes | 106/15.05 |
| 4,153,467 | 5/1979 | Yano et al. | 106/20 |
| 4,165,399 | 8/1979 | Germonprez | 427/264 |
| 4,176,361 | 12/1979 | Kawada et al. | 346/1.1 |
| 4,197,135 | 4/1980 | Bailey | 106/23 |
| 4,238,807 | 12/1980 | Bovio et al. | 346/140 |
| 4,243,994 | 1/1981 | Kobayashi et al. | 346/140 |
| 4,248,746 | 2/1981 | Greiner | 260/23 |
| 4,250,512 | 2/1981 | Kattner et al. | 346/140 |
| 4,273,847 | 6/1981 | Lennon et al. | 430/106 |
| 4,279,653 | 6/1981 | Makishima et al. | 106/22 |
| 4,281,329 | 7/1981 | Yano et al. | 346/1.1 |
| 4,312,009 | 1/1982 | Lange | 346/140 |
| 4,337,183 | 6/1982 | Santiago | 524/446 |
| 4,343,653 | 8/1982 | Beach | 106/22 |
| 4,353,078 | 10/1982 | Lee et al. | 346/140 |
| 4,361,843 | 11/1982 | Cooke et al. | 346/1.1 |
| 4,381,946 | 5/1983 | Uehara et al. | 106/22 |
| 4,386,961 | 6/1983 | Lin | 106/22 |
| 4,390,369 | 6/1983 | Merritt et al. | 106/31 |
| 4,395,287 | 7/1983 | Kobayashi et al. | 106/20 |
| 4,396,429 | 8/1983 | Matsumoto et al. | 106/20 |
| 4,400,215 | 8/1983 | Cooke et al. | 106/22 |
| 4,409,040 | 10/1983 | Tabayashi et al. | 106/20 |
| 4,421,559 | 12/1988 | Owatari | 106/20 |
| 4,426,227 | 1/1984 | Keeling et al. | 106/27 |
| 4,443,820 | 4/1984 | Mutoh et al. | 358/296 |
| 4,475,113 | 10/1984 | Lee et al. | 346/1.1 |
| 4,490,731 | 12/1984 | Vaught | 106/31 |
| 4,531,976 | 7/1985 | Lin | 106/27 |
| 4,537,631 | 8/1985 | Cooke et al. | 106/22 |

FOREIGN PATENT DOCUMENTS

| | | |
|---|---|---|
| 147257A | 7/1985 | European Pat. Off. |
| 2101864 | 7/1972 | Fed. Rep. of Germany |
| 2441478 | 3/1975 | Fed. Rep. of Germany |
| 2753816 | 6/1978 | Fed. Rep. of Germany |
| 49-80708 | 7/1974 | Japan |
| 55-54368 | 4/1980 | Japan |
| 55-468 | 1/1981 | Japan |
| 129274 | 1/1981 | Japan |
| 113462 | 9/1981 | Japan |
| 23665 | 2/1982 | Japan |
| 166274 | 10/1982 | Japan |

OTHER PUBLICATIONS

Abstract of Jap. Appln. No. 132,548, "Ink Compositions for Ink Injection Type Recording Apparatus".
Abstract No. 95:229337z, "Preparation of Hectographic Plates", 74–*Radiation Chem. Photochem.*, vol. 95, p. 643 (1981).
Japanese Abstract No. 56-113462(A).

(List continued on next page.)

*Primary Examiner*—Amelia Burgess Yarbrough
*Attorney, Agent, or Firm*—Woodcock Washburn Kurtz Mackiewicz & Norris

[57] ABSTRACT

A novel ink jet composition for use in drop on demand ink jet printers is disclosed comprising 85–99 weight percent of a vehicle consisting essentially of dibutyl sebacate and oleic acid. In the preferred embodiment, the dibutyl sebacate comprises between about 40 to 65, preferably about 60 weight percent of said ink. The subject ink, when utilizing an infrared readable colorant such as nigrosine base, is particularly suited for generating IR readable bar codes.

13 Claims, No Drawings

OTHER PUBLICATIONS

Japanese Abstract No. J56166-274.
*Industrial Waxes*, H. Bennett, vols. 1 and 2, Chemical Publishing Co., Inc. New York, N.Y. (1975).
Owens, "New Ink-Writing Methods for Graphic Recording", Instruments & Control Systems, vol. 38, pp. 100-102, Jul., 1965.

Hendricks, "Ink Splitter for Hot Melt Ink", IBM Technical Disclosure Bulletin, vol. 28, No. 3A, pp. 947-948, Aug., 1983.

Sweet, Richard G., "High Frequency Oscillography with Electrostatic Deflected Ink Jets", Stanford Electronics, Ltd., Technical Report No. 1722-1, Mar., 1964.
Handbook of Chemistry and Physics, 49th Edition.

DROP ON DEMAND INK JET INK COMPRISING DUBUTYL SEBECATE

This is a continuation of application Ser. No. 801,015, filed Nov. 22, 1985, now abandoned, which in turn is a continuation-in-part of Ser. No. 610,627, filed 5/16/84, now abandoned, which in turn is a continuation-in-part of Ser. No. 507,918, filed 6/27/83, now U.S. Pat. No. 4,484,948, which in turn is a continuation of Ser. No. 331,604, filed 12/17/81, issued as Pat. No. 4,390,369. The parent of this application, Ser. No. 801,015, is also a continuation-in-part of Ser. No. 668,095, filed 11/5/84, now abandoned. Ser. No. 801,015 is also a continuation-in-part of application Ser. No. 644,542, filed 8/27/84, which issued as U.S. Pat. No. 4,659,383. Ser. No. 801,015 is a continuation of Ser. No. 248,551, filed 3/27/81, now U.S. Pat. No. 4,361,843. Ser. No. 801,015 is also a continuation-in-part of Ser. No. 565,124, filed 12/23/83, now abandoned, which in turn is a continuation of application Ser. No. 394,154, filed 7/1/82, now abandoned. Ser. No. 801,015 is also a continuation-in-part application of Ser. No. 672,587, filed 11/16/84, now abandoned, which in turn is a continuation-in-part of Ser. No. 522,837, filed 8/12/83, now issued as U.S. Pat. No. 4,531,976, which in turn is a continuation of Ser. No. 327,994, filed 12/7/81, issued as U.S. Pat. No. 4,400,215. Ser. No. 810,015 is also a continuation-in-part of Ser. No. 501,074, filed 6/6/83, issued as U.S. Pat. No. 4,531,976, which in turn is a continuation of Ser. No. 331,603, filed 12/26/81, now U.S. Pat. No. 4,386,961. All of these patents and applications are assigned to the assignee of the present application, and are hereby incorporated by reference.

BACKGROUND OF THE INVENTION

The present invention relates to the field of ink jet inks, and more particularly to the field of ink jet inks which have been formulated for use in drop on demand ink jet printers.

Drop on demand ink jet printers present a number of unique problems which are not encountered by many other types of ink jet printers. For example, drop on demand ink jet printers may have to sit in a stand-by or cooled down mode for some period of time between printing cycles. Unlike continuous stream ink jet printers, which will "clean out" the ink which has been standing in the discharge orifice, drop on demand printers normally operate by beginning the printing cycle with such material. Accordingly, start-up problems are often encountered if the subject inks are not specially formulated to reduce such start-up problems. See for example, U.S. Pat. No. 4,400,215, relating to methods and inks for reducing start-up problems.

IR readable inks are also known. See European application EP-147257-A published July 3, 1985 assigned to Eastman Kodak, disclosing IR readable bar code ink jet inks comprising a dye, binder, solvent blend and specific IR absorbing compound. Another example of an IR readable ink used in a different context is disclosed in U.S. Pat. No. 4,069,179 (Jones) which discloses transfer elements comprising a substantially non-absorbent base having a coating comprising a continuous phase containing, as a discontinuous phase, a colorant carried by a vehicle comprising at least one $C_{12}$ to $C_{20}$ alcohol, said vehicle having a melting point below about 20° C. A variety of colorants, including salts of dyes and pigments such as carbon black, and/or a nigrosine base colorant admixed with a fatty acid developer such as oleic acid are disclosed.

Other beneficial characteristics of drop on demand inks include the obtainable dot size and clarity of print generated by drop on demand printers. This problem is addressed in U.S. Pat. No. 4,361,843, which discloses that suitable drop on demand ink jet inks may comprise a mixture of oleic acid in an approximate weight of from 20 to 80 percent of the total mixture of the composition. The therein disclosed ink also includes a dye or a dye in a solvent. In this regard, also refer to Japanese patent application 017,758, filed Feb. 22, 1977 to Toyo, Inc. Mfg.; and Japanese patent application 132,548, filed Nov. 28, 1973 entitled "Ink Compositions for Ink Injection Type Recording Apparatus".

Various additives have been suggested for use with inks comprising oleic acid. See for example the above-mentioned U.S. patent, which discloses, inter alia the use of a solvent comprising benzyl alcohol and/or benzyl ether. Of course, these inks also disclose various colorants, including dyes such as typophor black, chinoline yellow, oil yellow, and nigrosine base. In this regard, it should be noted that typophor black as commonly provided comprises 30 weight percent of nigrosine and 70 weight percent of oleic acid. In U.S. Pat. No. 4,386,961, additional ink jet ink compositions are disclosed which comprise small proportions of oleic acid, and relatively larger proportions of benzyl alcohol and propylene glycol. Alternatively, formulations up to 10 percent oleic acid combined with diethylene glycol and methoxy triglycol together with a colorant and one or more additives are also disclosed in this U.S. patent.

Another approach which has been taken is the formulation of ink jet inks which are solid at room temperature. These include those described in U.S. Pat. No. 4,390,369 in related application Ser. No. 644,542, filed Aug. 27, 1984, entitled "High Molecular Weight, Hot Melt Impulse Ink Jet Ink", and, to the extent applicable, those ink compositions cited in connection with the prosecution of that patent and its related applications. For example, the Kurz and Berry patents, which relate to electrostatic printing processes, disclose the use of various inks including inks comprising didodecyl sebacate.

For further disclosures of ink jet inks, also please refer to U.S. patent application No. 565,124, filed Dec. 23, 1983, entitled "Stearic Acid Containing Ink Jet Inks", and its parent application Ser. No. 394,154, filed July 1, 1982. Also of interest is application Ser. No. 672,587, filed Nov. 16, 1984, entitled "Low Corrosion Impulse Ink Jet Ink", which discloses an ink jet ink comprising a fatty acid vehicle, a colorant, and amounts of anti-oxidant which are effective to substantially reduce the rate of ink induced metal corrosion. In accordance with this disclosure, the preferred fatty acid vehicle is oleic acid, which is described as comprising 10 to 97 weight percent of the subject ink. The subject ink further comprises 10 to 90 weight percent of a vehicle additive which may, for example, comprise benzylalcohol, benzyl ether or any of a variety of other specified additives. The subject application further discloses that the preferred inks comprise 3-20, preferably 10-17, more preferably 15 weight percent of one or more vehicle-soluble dyes, such as chinoline yellow, nigrosine base, acetosol brown, orasol black, and oil yellow.

Notwithstanding the advances and disclosures represented in the aforementioned patents and patent applications, a need still exists for a liquid ink jet ink which is readily jettable by drop on demand ink jet printers, which is not susceptible to start-up problems after extended periods of printer inactivity, which produces a high print quality, and which otherwise exhibits beneficial ink jet ink characteristics.

SUMMARY OF THE INVENTION

The present invention provides a novel ink jet ink for use in a drop on demand ink jet printing apparatus which comprises a vehicle consisting essentially of dibutyl sebacate and oleic acid. The subject ink, which is liquid at room temperature, exhibits excellent jet performance, with little or no start-up problems, and a frequency response equal to or exceeding 12kHz. The subject ink is very stable to the environment, exhibiting little moisture absorption and/or vehicle evaporation, and a very low corrosion rate. It also exhibits very low toxicity.

In the preferred embodiment, the subject ink comprises 85-99 weight percent of said vehicle, consisting essentially of 30 to 80 weight percent dibutyl sebacate and 20 to 70 weight percent oleic acid. The subject ink further comprises 1 to 15, preferably about 12 weight percent of a colorant. More particularly, the preferred inks comprise 40 to 65, preferably about 60 weight percent of dibutyl sebacate. The inks of the present invention are particularly adapted for printing infrared ("IR") readable bar codes. When the colorant used is an IR readable colorant, such as nigrosine base or typophor black, the preferred inks have been found to have an IR paper contrast signal greater than or equal to 0.75 on special paper. It is theorized that the dibutyl sebacate, which is a plasticizer, acts to control migration of the colorant to encourage vertical penetration into the printing substrate. It is further theorized that start-up problems are minimized by reason of the selection of well matched ink components which do not have high evaporation rates, and which do not evaporate at appreciably differential rates from the ink jet nozzle.

Accordingly, the present invention provides a novel method of ink jet printing using a drop on demand jetting apparatus comprising the steps of providing an ink jet ink comprising 85-99 weight percent of a vehicle consisting essentially of 30 to 80 weight percent dibutyl sebacate and 20 to 70 weight percent oleic acid, which ink further comprises 1-15 weight percent of a colorant. The ink thus provided is elevated to a temperature which reduces its viscosity to less than 15 centipoises, whereupon it is jetted from said apparatus to form high print quality indicia, such as bar codes, on a substrate.

Accordingly, a primary object of the present invention is the provision of an improved ink for use in drop on demand ink jet printers.

A further object of the present invention is the provision of an improved drop on demand ink jet ink which does not exhibit start-up problems.

A further object of the present invention is the provision of an improved printing method comprising drop on demand printing of an improved ink to form IR readable bar codes.

These and other objects of the present invention will become apparent from the following, more detailed description.

DESCRIPTION OF THE PREFERRED EMBODIMENTS

The present invention provides a novel ink jet ink composition for use on drop on demand ink jet printers. Such drop on demand ink jet printers are those wherein the ink is stored in the print head or nozzle until it is necessary to generate indicia on a print substrate, whereupon the apparatus is activated to discharge a selected number of droplets directly onto the print or target substrate. As used herein, the term "drop on demand" is intended to include impulse ink jet printers, but to exclude continuous ink jet printers, and/or electrostatic ink printers, which function in different manners to achieve jet printing.

The preferred ink of the present invention comprises a vehicle consisting essentially of 30 to 80 weight percent dibutyl sebacate and 20 to 70 weight percent oleic acid. This vehicle comprises 85-99 weight percent of the subject ink. Dibutyl sebacate (n-Decanedioic acid di-n-butyl ester) is an ester having the chemical formula: $H_9C_4OOC(CH_2)_8COOC_4H_9$. Its boiling point at 4 mmHg is 367°-381° F. Its vapor pressure at 200° C. is 10 mmHg. Dibutyl sebacate is a pale yellow liquid with low odor at room temperature which is slightly soluble in water. Its evaporation rate (nBuAc=1) is negligible (approx. 0). In the preferred embodiment the dibutyl sebacate comprises between about 40 to 65 weight percent, preferably about 60 weight percent of said ink. Although less preferred, the subject ink may further comprise up to 30 weight percent of an ink additive, such as a solvent or other ink additive. Benzyl ether in amounts up to 20 weight percent is currently preferred for this purpose. Benzyl ether (dibenzyl ether) is a colorless/pale yellow liquid at room temperature, having a boiling point of 295° (dec) C. at 760 mmHg, which is insoluble in water. Alternate, less preferred ink additives may be selected from the group consisting of n-methyl pyrrolidone, benzyl alcohol, methoxy triglycol, diethylene glycol, and mixtures thereof. Various other ink additives are well known to the art, and may be utilized for the purpose of altering the viscosity of the subject ink, improving its penetration or drying characteristics, or for other known purposes.

This preferred ink further comprises 1 to 15 weight percent of a colorant. The preferred colorant comprises nigrosine base, which may be provided in the form of typophor black, which itself a mixture of oleic acid and nigrosine.

Other colorants which may be used in the subject inks include one or more vehicle soluble dyes including chinoline yellow, acetosol brown, orasol black and oil yellow. Nigrosine base and typophor black dyes are particularly suitable for use in the present ink to produce infrared readable indicia, since they have been found to have a wide spectrum absorption range of from at least 500 nm to 900 nm. Bar code print made using these inks has shown very good readability by an infrared reader operating at 940 nm, and by a visible reader operating at 633 nm. Accordingly, these inks should be readable by most commercial bar code readers, which generally operate in the 600 nm to 960 nm range.

In the following Table I, four inks within the scope of the invention (examples 4-7) are disclosed, of which formulations 6 and 7 are presently preferred. Examples 1-3 in this Table are set forth for purposes of comparison. In the following Table, formulas 1 and 2 are jettable, but have start-up (first droplet formulation after idle for a period time) problems. The print produced thereby is IR readable. By contrast, formulations numbers 6 and 7 have improved jet performance, exhibiting virtually no start-up problems at room temperatures.

Ink formulation numbers 3 to 5 vary in performance between the inks of formula 1 (which is worst) and that of formula 7 (which is currently believed to be the best formula).

TABLE 1

| INK # | 1 | 2 | 3 | 4 | 5 | 6 | 7 |
|---|---|---|---|---|---|---|---|
| Diethylene Glycol | 20 | 34 | — | — | — | — | — |
| Oleic Acid | 35 | 10 | 28 | 28 | 35 | 28 | 28 |
| Dibutyl Sebacate | — | — | — | 40 | 33 | 40 | 60 |
| Methoxy Triglycol | 35 | 34 | 60 | 20 | 20 | — | — |
| Benzyl Ether | — | — | — | — | — | 20 | — |
| Nigrosine Base | 10 | — | 12 | 12 | 12 | 12 | 12 |
| Typophor Black | — | 22 | — | — | — | — | — |
| Viscosity | | | | | | | |
| 25° C. | 40 | — | 30.5 | 32.3 | 33.5 | 30.7 | 36.4 |
| 55° C. | 13.5 | — | 10.7 | 11.6 | 14.3 | 12.3 | 13.6 (57° C.) |
| Surface Tension | | | | | | | |
| 25° C. | — | — | — | — | — | 32.1 | 30.6 |

Inks of the present invention are generally designed to be jetted at temperatures of between 50 and 70 Centigrade, at which temperatures suitable jetting viscosities of less than 15 centipoises, preferably in the range of 10-13 centipoises, are easily obtained. The ink of formula number 7 is particularly preferred because of its infrared readable characteristics, exhibiting a paper contrast signal equal to in excess of 0.75 on special paper, excellent jet performance, exhibiting little or no start-up difficulty at room temperature and a frequency response of greater than or equal to 12 kHz; very good stability to the environment exhibiting little moisture absorption or vehicle evaporation; very low corrosion rate, and very low toxicity. The aforementioned paper contrast signal (PCS), is determined by subtracting the reflectance of the print from the reflectance of the paper, and dividing the result by the reflectance of the paper. The special paper used for these tests was a barium sulfate (baryata) coated paper. This paper is available from the Sholler Paper Company (Pulaski, N.Y.). It is coated with a fine layer of barium sulfate, sufficient to reduce the lateral spread of the dots using the subject ink, and thereby improving the dot size control and clarity of the subject bar codes.

In determining the aforementioned "start-up" characteristics, measurement was taken of the ink droplet velocities before and after the ink droplet machine was permitted to stand idle for a period of time. The results obtained using ink formula number 7 above is listed in Table 2.

TABLE 2

| IDLE TIME | DROPLET VELOCITY (m/sec) |
|---|---|
| 0 | 9.5 ± 0.8 |
| 16 hrs. | 9.8 ± 1.2 |
| 48 hrs. | 9.0 ± 0.8 |

As seen from the above Table, formula number 7 exhibits no noticeable start-up problem after standing for two days. By comparison, formulas 1 and 2 as set forth in Table 1 have unstable jet performance after the printer is permitted to stand idle for more than 4 hours, thereby making any velocity measurements meaningless.

In view of the above, those of ordinary skill in the art will appreciate that a superior ink jet ink is disclosed. They will also understand that the various departures can be made from the specific teachings of this application, without departing from the scope of the present invention, which is more particularly defined in the claims appended hereto.

What is claimed:

1. An ink jet ink composition for use in drop on demand ink jet printers, consisting essentially of:
   (a) 85-99 weight percent of a vehicle consisting essentially of:
      (i) 30 to 80 weight percent dibutyl sebacate and
      (ii) 20 to 70 weight percent oleic acid; and
   (b) 1-15 weight percent colorant.
2. The ink composition of claim 1 wherein said dibutyl sebacate comprises between about 40 to 65 weight percent of said ink.
3. The ink composition of claim 1 wherein said dibutyl sebacate comprises about 60 weight percent of said ink.
4. The ink composition of claim 1 wherein said colorant comprises nigrosine base.
5. The ink composition of claim 1 wherein said colorant comprises typophor black.
6. The ink composition of claim 1 wherein said colorant comprises about 12 weight percent of said ink.
7. The ink of claim 1 wherein said ink further comprises up to 30 weight percent of benzyl ether as an ink additive.
8. The ink of claim 1 wherein said ink comprises up to 30 weight percent of an ink additive.
9. The ink of claim 8 wherein said ink additive comprises about 20 weight percent of benzyl ether.
10. A method of ink jet printing using a drop on demand jetting apparatus comprising:
    (a) providing an ink jet ink comprising:
       (i) 85-99 weight percent of a vehicle consisting essentially of 30-80 weight percent dibutyl sebacate and 20 to 70 weight percent oleic acid; and
       (ii) 1-15 weight percent colorant;
    (b) elevating the temperature of that ink to reduce its viscosity to less than 15 centipoises; and
    (c) jetting said ink from said apparatus to form indicia or substrate.
11. The method of claim 10 wherein said colorant is selected to be infrared readable.
12. The method of claim 11 wherein said indica are bar codes.
13. The method of claim 12 wherein said substrate is selected to be a barium sulfate coated substrate.

* * * * *